United States Patent
Suchowski et al.

(10) Patent No.: US 9,442,250 B2
(45) Date of Patent: Sep. 13, 2016

(54) WAVEGUIDE ARRANGEMENTS BASED ON ADIABATIC ELIMINATION

(71) Applicants: Haim Suchowski, Tel Aviv (IL); Michael Mrejen, Jerusalem (IL); Chihhui Wu, Berkeley, CA (US); Yuan Wang, Albany, CA (US); Xiang Zhang, Alamo, CA (US)

(72) Inventors: Haim Suchowski, Tel Aviv (IL); Michael Mrejen, Jerusalem (IL); Chihhui Wu, Berkeley, CA (US); Yuan Wang, Albany, CA (US); Xiang Zhang, Alamo, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/813,440

(22) Filed: Jul. 30, 2015

(65) Prior Publication Data
US 2016/0085025 A1    Mar. 24, 2016

Related U.S. Application Data

(60) Provisional application No. 62/031,751, filed on Jul. 31, 2014.

(51) Int. Cl.
| | | |
|---|---|---|
| *G02B 6/28* | (2006.01) | |
| *G02F 1/01* | (2006.01) | |
| *G02B 6/293* | (2006.01) | |
| *G02B 6/122* | (2006.01) | |
| *G02B 6/12* | (2006.01) | |
| *G02F 1/00* | (2006.01) | |

(52) U.S. Cl.
CPC ......... *G02B 6/29331* (2013.01); *G02F 1/0118* (2013.01); *G02B 6/122* (2013.01); *G02B 6/1226* (2013.01); *G02B 2006/12097* (2013.01); *G02F 1/00* (2013.01)

(58) Field of Classification Search
CPC .. G02B 6/29331; G02F 1/011; G02F 1/0118
See application file for complete search history.

(56) References Cited

U.S. PATENT DOCUMENTS

| | | | | |
|---|---|---|---|---|
| 2002/0122615 A1* | 9/2002 | Painter | ................... | B82Y 20/00 385/15 |
| 2002/0191266 A1* | 12/2002 | Melloni | ................... | G02F 1/225 359/246 |
| 2006/0222281 A1* | 10/2006 | Deliwala | ................. | G02F 1/011 385/8 |
| 2012/0301071 A1* | 11/2012 | Kung | .................... | G02F 1/0118 385/9 |

OTHER PUBLICATIONS

Lahini, Y., Pozzi, F., Sorel, M., Morandotti, R., Silberberg, Y., EIT and STIRAP in Waveguides: Linear and Nonlinear Effects in a Three-Core Coupled System. Nonlinear Photonics, BGPP.2007. JWBPDP1, Quebec City, Canada (2007).
Lahini, Y. et al., Effect of Nonlinearity on Adiabatic Evolution of Light. Phys. Rev. Lett., 101, 193901 (2008).

(Continued)

*Primary Examiner* — Jerry Rahll
(74) *Attorney, Agent, or Firm* — Lawrence Berkeley National Laboratory

(57) ABSTRACT

This disclosure provides systems, methods, and apparatus related to nanophotonics. In one aspect, an arrangement of waveguides includes a substrate and three waveguides. Each of the three waveguides may be a linear waveguide. A second waveguide is positioned between a first waveguide and a third waveguide. The dimensions and positions of the first, the second, and the third waveguides are specified to substantially eliminate coupling between the first waveguide and the third waveguide over a distance of about 1 millimeter to 2 millimeters along lengths of the first waveguide, the second waveguide, and the third waveguide.

20 Claims, 12 Drawing Sheets

(56) References Cited

OTHER PUBLICATIONS

Longhi, S., Adiabatic passage of light in coupled optical waveguides, Phys. Rev. E, 73, 026607 (2006).
Ciret, C., Coda, V., Rangelov, A. A., Neshev, D. N., Montemezzani, G. Broadband adiabatic light transfer in optically induced waveguide arrays. Phys. Rev. A, 87, 013806 (2013).
Hardy, A., Streifer, W. Coupled mode solutions of multiwaveguide systems. IEEE J. Quantum Electron., 22, 528-534 (1986).
Ruschin, S., Marom E., Coupling effects in symmetrical three-guide structures, JOSA A, 1, 1120-1128 (1984).
Kalonakis, K., Paspalakis, E. Optical switching in a symmetric three-waveguide nonlinear directional coupler. Journal of Modern Optics 52, 1885-1892 (2005).

* cited by examiner

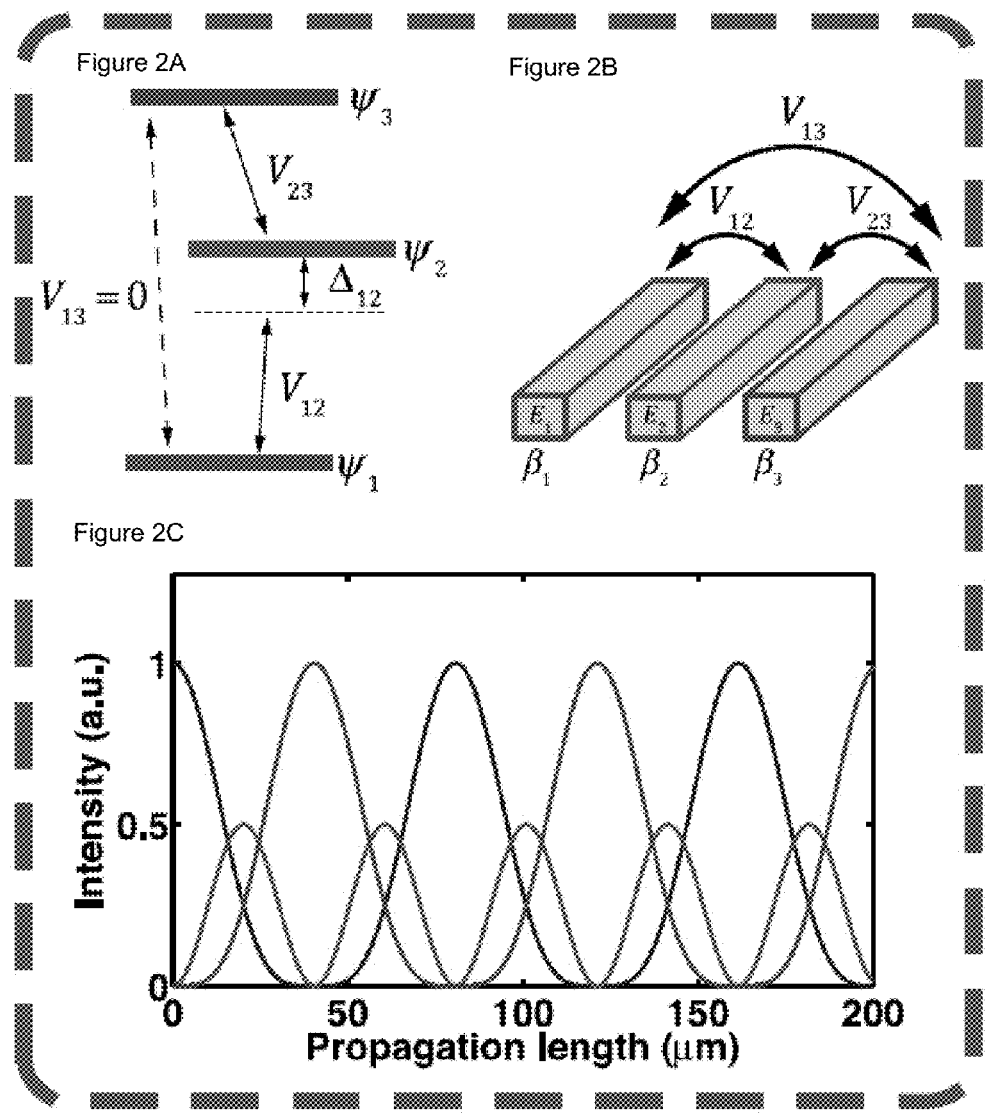

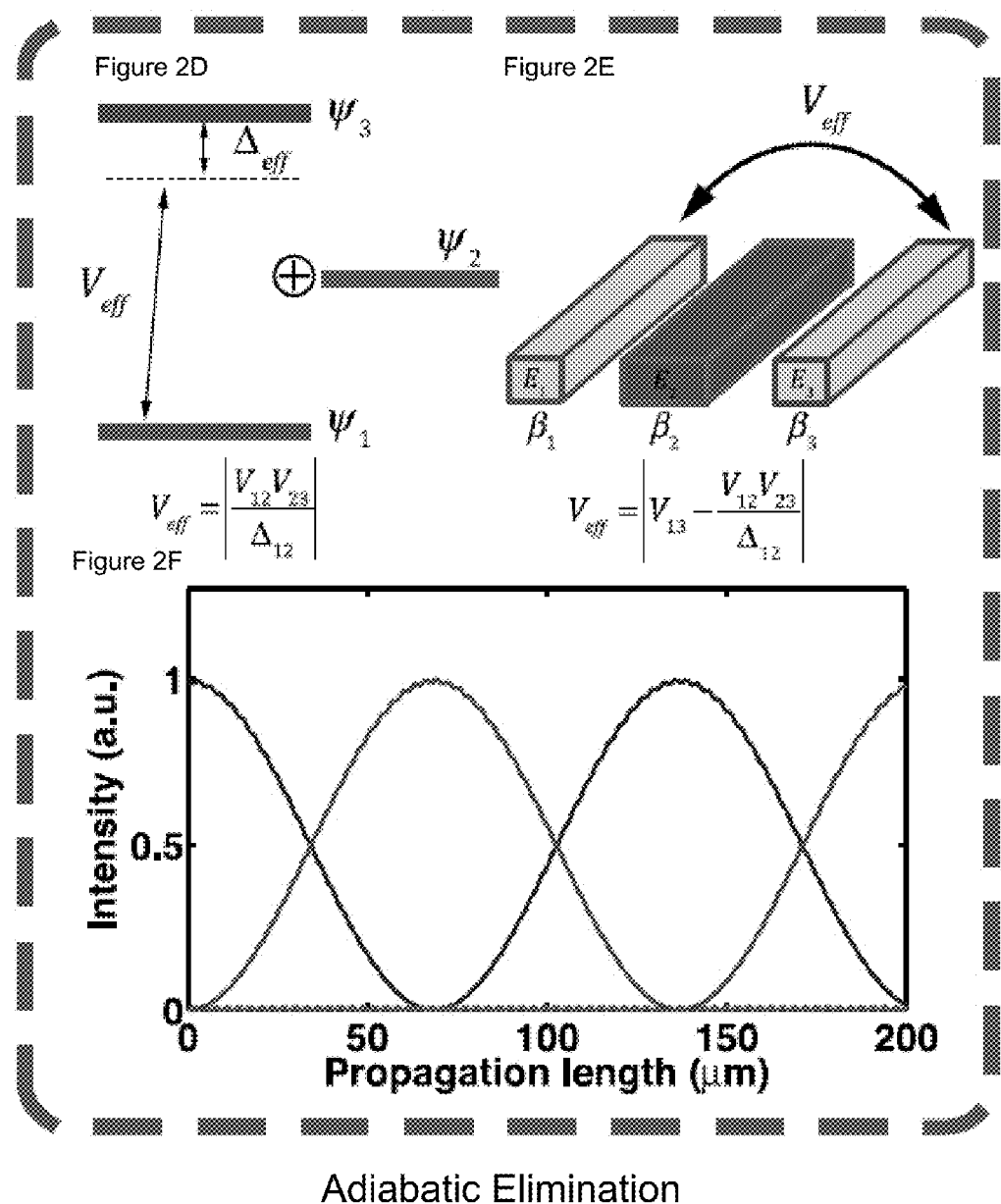

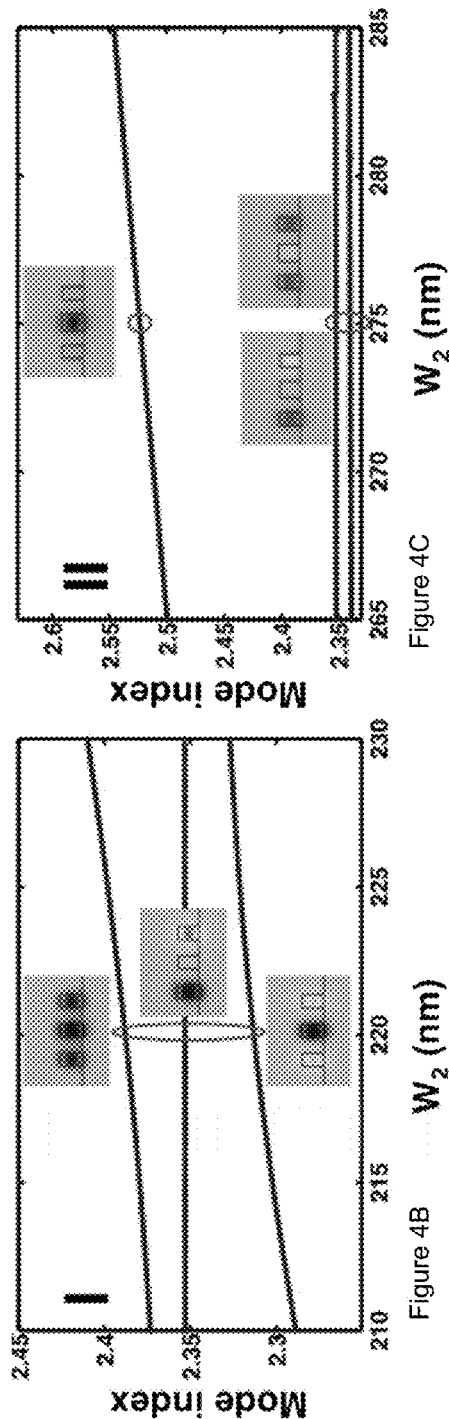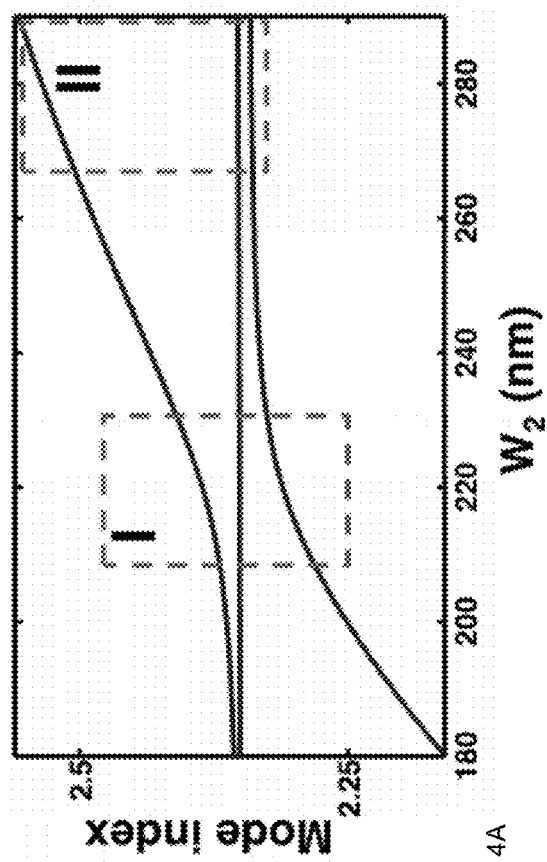
Figure 4A
Figure 4B
Figure 4C

US 9,442,250 B2

WAVEGUIDE ARRANGEMENTS BASED ON ADIABATIC ELIMINATION

RELATED APPLICATIONS

This application claims priority to U.S. Provisional Patent Application Ser. No. 62/031,751, filed Jul. 31, 2014, which is herein incorporated by reference.

STATEMENT OF GOVERNMENT SUPPORT

This invention was made with government support under Contract No. DE-AC02-05CH11231 awarded by the U.S. Department of Energy and under Grant No. N00014-13-1-0678 awarded by the Office of Naval Research (ONR) MURI program. The government has certain rights in this invention.

TECHNICAL FIELD

This disclosure relates generally to nanophotonics and more particularly to nanophotonic waveguides.

BACKGROUND

The ever growing need for energy-efficient and fast communications is driving the development of highly integrated photonic circuits where controlling light at the nanoscale becomes the most critical aspect of information transfer [1]. Routing and coupling devices based on Multimode Interference (MMI) [2,3,4] and evanescent coupling [5,6] are important building blocks in these integrated photonics circuits and have been employed as optical modulators, as mode converters and switches for high speed communication [7-9], and in data processing and integrated quantum operations [10-11]. However, active control over the coupling between closely packed waveguides is highly desirable and yet remains a critical barrier towards ultra-small footprint devices. A general approach to achieve active control in waveguide systems is to exploit optical nonlinearities enabled by a strong control pulse [12-18]. However, these devices suffer from the nonlinear absorption induced by the intense control pulse as the signal and its control propagate in the same waveguide [12, 17-18].

SUMMARY

A unique scheme based on the adiabatic elimination (AE) concept that effectively manipulates the coupling between densely packed waveguides is experimentally demonstrated, as described below. Active coupling control between two closely packed waveguides by tuning the mode index of an in-between decoupled waveguide is demonstrated. In this control scheme, the nonlinearity influences the refractive index of a dark mode and thus leaves the signal unaffected by the induced losses. Such a scheme is a promising candidate for ultra-dense integrated nano-photonics, such as on-chip ultrafast modulators and tunable filters for optical communication and quantum computing.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 2A-2F show a schematic comparison between the evolution of identical three-mode system and the AE evolution, both in the atomic physics realization and in directional waveguides.

FIG. 4A-4C show a band diagram of a three-mode coupler with varying middle waveguide width $W_2$.

DETAILED DESCRIPTION

Figure 1A:
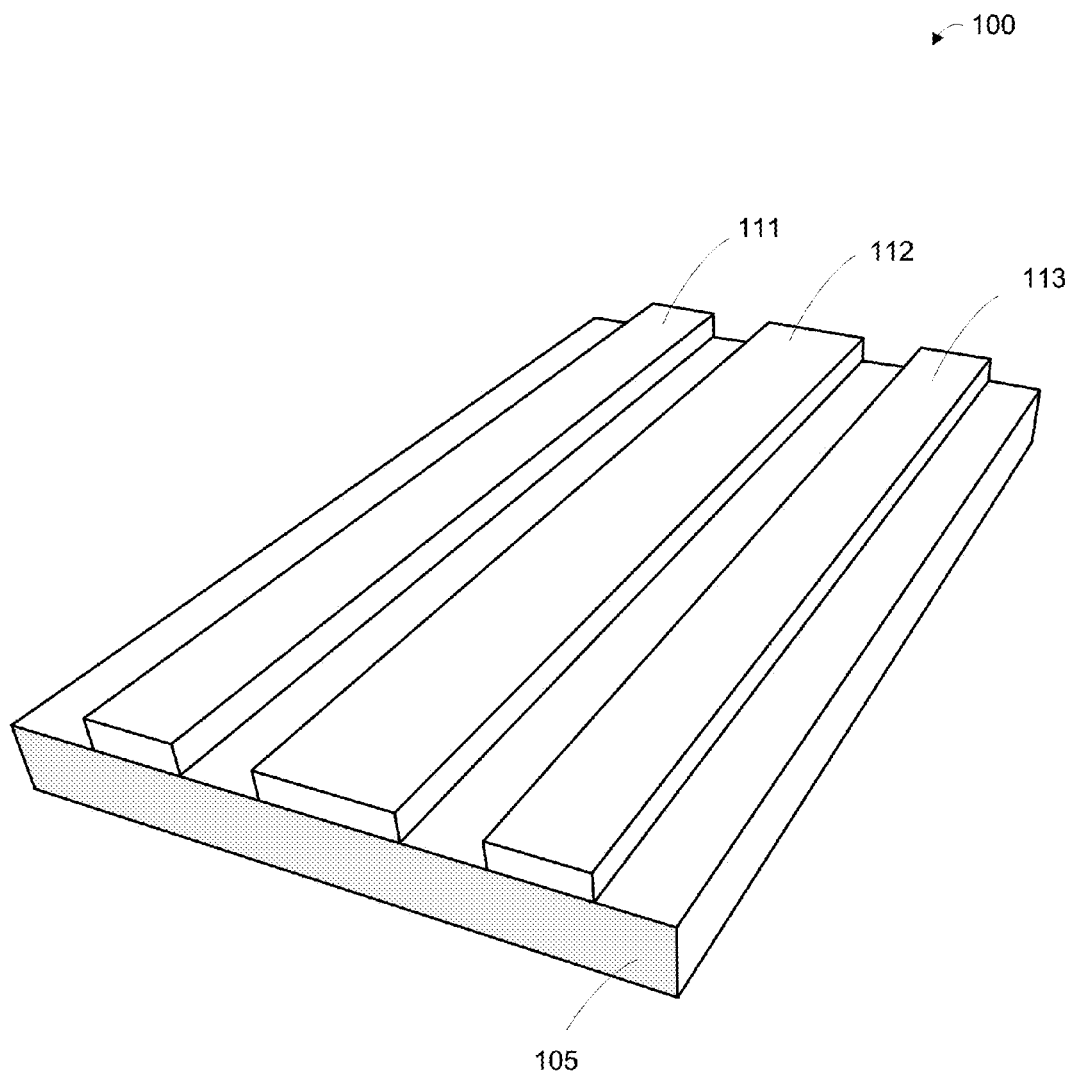
FIG. 1A shows an example of an isometric illustration of an arrangement of waveguides.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Introduction

Two coupled modes are a cornerstone in many research fields—from the dynamics of spin-half systems in nuclear magnetic resonances through two-level systems in atomic and molecular physics to polarization optics and directional couplers [6, 19-20]. The dynamics in these systems are generally dictated by two independent quantities: the coupling strength and the phase difference between the interacting states or modes. While active control of these quantities is available in the atomic systems, it remains a challenge in photonics realizations. Quantum control theory (QCT) offers the mathematical framework to decompose multi-levels systems represented by multidimensional Hilbert spaces into controllable two coupled mode systems [21-22]. For instance, in three level atomic systems, several schemes were proposed to reduce the full 8-dimensional Hilbert space into the 3-dimensional space of atomic two level systems [21-23]. One example is the atomic stimulated rapid adiabatic passage (STIRAP) scheme [24], which was recently shown in coupled waveguide systems [25-28]. However, this scheme cannot provide a dynamic control of energy transfer between the two outer waveguides. Moreover, this scheme requires long propagation distance along the waveguides which makes device scaling down difficult.

A unique scheme to actively control the coupling among waveguides for densely integrated photonics based on adiabatic elimination (AE) is experimentally demonstrated below. Analogous to atomic systems [24, 29-30], AE is achieved by applying a decomposition on a three waveguide coupler, where the two outer waveguides serve as an effective two-mode system (analogous to the ground and excited states in an atomic three level system), and the middle waveguide is the equivalent to the intermediate 'dark' state. The AE decomposition scheme in nanowaveguides and its capability of active control of the coupling between two waveguides by manipulating the mode index of a decoupled middle one is experimentally shown. As the AE procedure separates the signal (information) from the control, it reduces significantly two-photon absorption (TPA) and TPA-induced free carrier absorption experienced by the signal, which are major obstacles in silicon photonics [17-18]. In addition, an analysis also includes the inherent higher order coupling, which is significant when packing is sub-wavelength, allowing control capabilities beyond what can be achieved in atomic physics. This new class of AE-based nanophotonic devices lays the foundation for ultra-dense integrated photonic circuits.

Devices

FIG. 1A shows an example of an isometric illustration of an arrangement of waveguides. As shown in FIG. 1A, the arrangement of waveguides 100 includes a substrate 105, and three waveguides arranged on the substrate, a first waveguide 111, a second waveguide 112, and a third waveguide 113. The first waveguide 111, the second waveguide 112, and the third waveguide 113 are linear waveguides that are substantially parallel to each other in the region shown in FIG. 1A (i.e., the waveguides are substantially parallel to each other over a specified distance). In some embodiments, the waveguides are not parallel to each other outside of the region shown in FIG. 1A. As shown in FIG. 1A, the second waveguide 112 is positioned between the first waveguide 111 and the third waveguide 113. The first waveguide 111 is positioned less than about 1 micron from the second waveguide 112; i.e., a gap or spacing between the first waveguide 111 and the second waveguide 112 is less than about 1 micron. Similarly, the second waveguide 112 is positioned less than about 1 micron from the third waveguide 113; i.e., a gap or spacing between the second waveguide 112 and the third waveguide 113 is less than about 1 micron. In some embodiments, the first waveguide 111 is positioned less than about 2 microns from the third waveguide 113.

In some embodiments, the waveguides 111, 112, and 113 have a rectangular or a square cross-section. Other cross-sections are also possible. For example, in some embodiments, the waveguides 111, 112, and 113 have circular, oval, trapezoidal, or polygonal cross-sections.

The first waveguide 111 and the third wave guide 113 have a first effective refractive index. The effective refractive index is a number quantifying the phase delay per unit length in a waveguide, relative to the phase delay in vacuum. The effective refractive index in a waveguide is dependent on the material of the waveguide, the geometry of the waveguide, and the intensity of the light that is injected into the waveguide. The first waveguide 111 and the third waveguide 113 both have cross-sectional dimensions of less that about 1 micron; i.e., the height and width of both the first waveguide 111 and the third waveguide 113 are less than about 1 micron. In some embodiments, the first waveguide 111 and the third waveguide 113 may be referred to as nanowaveguides. In some embodiments, the first waveguide 111 and the third waveguide 113 may be identical or substantially identical to one another; i.e., the first waveguide 111 and the third waveguide 113 may comprises the same material and have the same cross-sectional dimensions.

The second waveguide 112 has cross-sectional dimensions of less that about 1 micron; i.e., the height and width of the second waveguide 112 are less than about 1 micron. In some embodiments, the second waveguide 112 may be referred to as a nanowaveguide.

The dimensions and positions of the first waveguide 111, the second waveguide 112, and the third waveguide 113 are specified to eliminate or to substantially eliminate coupling between the first waveguide 111 and the third waveguide 113 over a distance along the waveguides. For example, if two waveguides are sufficiently close such that their fields overlap, light can be coupled from one waveguide into the other waveguide. When light is coupled from one waveguide into another waveguide, optical power can be transferred between the waveguides. Coupling length is defined as the distance light needs to propagate down a waveguide before it is transferred or fully transferred to another waveguide. For example, with two parallel waveguides, the coupling length is the distance that light needs to travel down the first waveguide before it is transferred to the second waveguide. With the arrangement of waveguides 100 shown in FIG. 1A (i.e., the waveguides being arranged to satisfy adiabatic elimination conditions), the coupling length for light coupling between the first waveguide 111 and the third waveguide 113 may be about 1.3 millimeters (mm), about 1 mm to 2 mm, or longer. In some embodiments, when coupling is to be eliminated or substantially eliminated between the first waveguide 111 and the third waveguide 113, the specified distance over which the waveguides are parallel or substantially parallel is less than the coupling length.

In some embodiments, for the arrangement 100 shown in FIG. 1A, coupling between the first waveguide 111 and the third waveguide 113 can be eliminated or substantially eliminated over a distance of about 1.3 mm, about 1 mm to 2 mm, or longer, along lengths of the first waveguide 111, the second waveguide 112, and the third waveguide 113 or along the direction of light propagation in the waveguides.

In some embodiments, the first waveguide 111 and the third waveguide 113 comprise a first material. In some embodiments, the first material comprises a first dielectric material or a first semiconductor material. For example, the first material may be silicon. In some embodiments, the second waveguide 112 comprises a second material. In some embodiments, the first material is the same as the second material. In some embodiments, the second material is selected from a group consisting of a second dielectric material, a second semiconductor material, and a metal. In some embodiments, the second waveguide 112 has a second effective refractive index. In some embodiments, the second effective refractive index is different than the first effective refractive index. For example, the second material may comprise silicon and the second waveguide 112 may have different cross-sectional dimensions (e.g., the second waveguide 112 may have a greater width) than the first waveguide 111 and the third waveguide 113 that also comprise silicon.

In some embodiments, the substrate 105 comprises silicon oxide. In some embodiments, the substrate 105 comprises a layer of silicon oxide disposed on a silicon substrate. In some embodiments, the substrate 105 comprises a material that has a lower index of refraction than the index of refraction of the first material and the second material.

In some embodiments, such as the arrangement 100 shown in FIG. 1A, the first waveguide 111, the second waveguide 112, and the third waveguide 113 may be disposed on the substrate 105. In some embodiments, the second waveguide 112 may be recessed in the substrate 105, in between with the first waveguide 111 and the third waveguide 113 that are disposed on a surface of the substrate 105. Alternatively, in some embodiments, the first waveguide 111 and the third waveguide 113 may be recessed in the substrate 105, with the second waveguide 112 disposed on a surface of the substrate 105 and positioned in between the first waveguide 111 and the third waveguide 113. There are other arrangements of the three waveguides that are possible.

Two wavelengths of light that are commonly used in photonics (silicon photonics, specifically) are 1.31 microns and 1.55 microns. In some embodiments, when using 1.31 micron wavelength light or 1.55 micron light with the waveguides 111, 112, and 113, the waveguides 111, 112, and 113 comprise silicon. In some embodiments, when using 1.31 micron wavelength light or 1.55 micron light with the waveguides 111, 112, and 113 having a rectangular cross-section, a height of the waveguides 111, 112, and 113 is about 200 nanometers (nm) to 500 nm, depending on a width of the waveguides 111, 112, and 113. In some embodiments, when using 1.31 micron wavelength light or 1.55 micron light with the waveguides 111, 112, and 113 having a rectangular cross-section, the width of the first and the third waveguides 111 and 113 is about 200 nm to 300 nm and the width of the second waveguide 112 is about 250 nm to 330 nm, depending on the height of the waveguides 111, 112, and 113. In some embodiments, the gap or spacing between the first waveguide 111 and the second waveguide 112 is about 150 nm to 300 nm. Similarly, in some embodiments, the gap or spacing between the second waveguide 112 and the third waveguide 113 is about 150 nm to 300 nm.

Figure 1B:
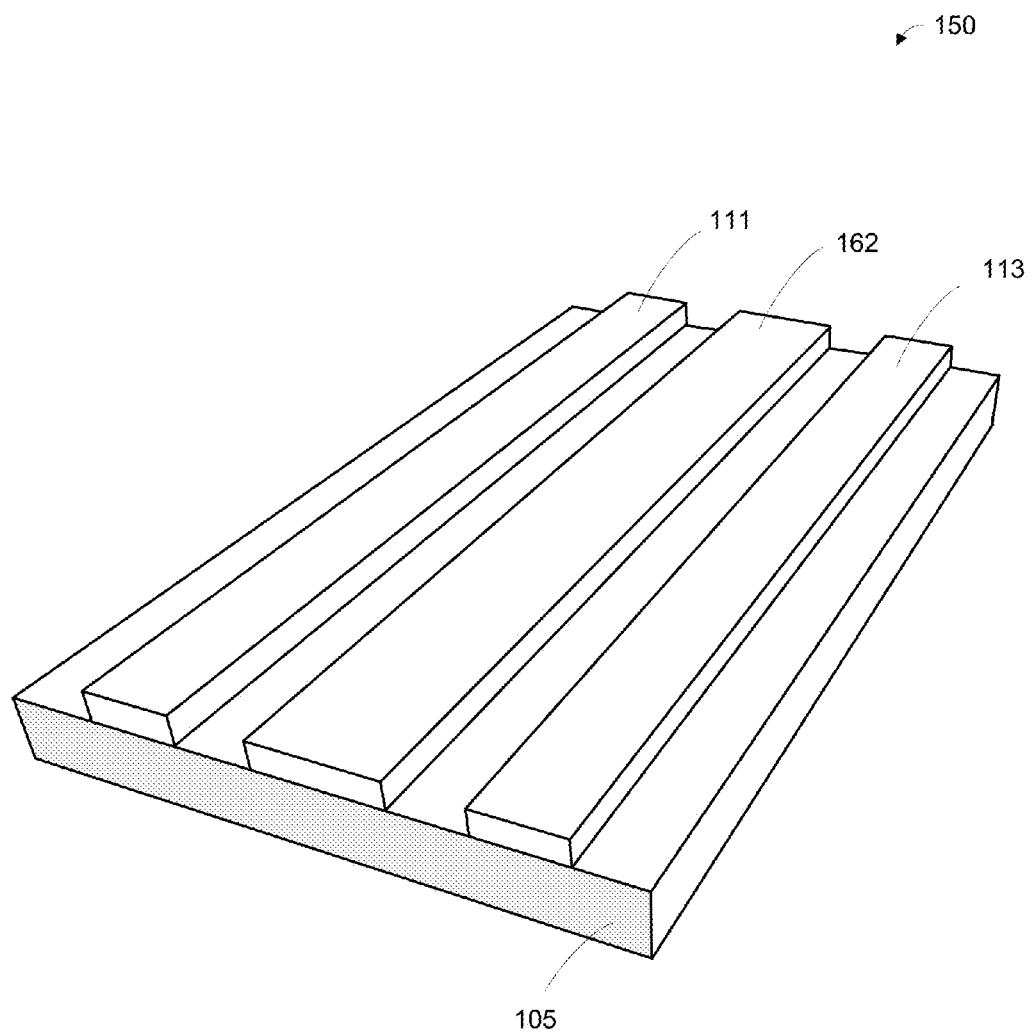
FIG. 1B shows an example of an isometric illustration of an arrangement of waveguides.

FIG. 1B shows an example of an isometric illustration of an arrangement of waveguides. In some embodiments, the arrangement 150 shown in FIG. 1B is similar to the arrangement 100 shown in FIG. 1A. As shown in FIG. 1B, the arrangement of waveguides 100 includes a substrate 105, and three waveguides arranged on the substrate, a first waveguide 111, a second waveguide 162, and a third waveguide 113. The first waveguide 111, the second waveguide 162, and the third waveguide 113 are linear waveguides that are substantially parallel to each other (i.e., the waveguides are substantially parallel to each other over a specified distance). As shown in FIG. 1B, the second waveguide 162 is positioned between the first waveguide 111 and the third waveguide 113. The first waveguide 111 is positioned less than about 1 micron from the second waveguide 162; i.e., the gap between the first waveguide 111 and the second waveguide 162 is less than about 1 micron. Similarly, the second waveguide 162 is positioned less than about 1 micron from the third waveguide 113; i.e., the gap between the second waveguide 162 and the third waveguide 113 is less than about 1 micron. In some embodiments, the first waveguide 111 is positioned less than about 2 microns from the third waveguide 113.

The first waveguide 111 and the third wave guide 113 both have a first effective refractive index. In some embodiments, the first waveguide 111 and the third wave guide 113 comprise a first material. In some embodiments, the first material comprises a first dielectric material or a first semiconductor material. For example, the first material may be silicon. The first waveguide 111 and the third waveguide 113 both have cross-sectional dimensions of less that about 1 micron; i.e., the height and width of both the first waveguide 111 and the third waveguide 113 are less than about 1 micron. In some embodiments, the first waveguide 111 and the third waveguide 113 have substantially the same cross-sectional dimensions. In some embodiments, the first waveguide 111 and the third waveguide 113 may be referred to as nanowaveguides. In some embodiments, the first waveguide 111 and the third waveguide 113 may be identical or substantially identical to one another; i.e., the first waveguide 111 and the third waveguide 113 may comprises the same material and have the same cross-sectional dimensions.

The second waveguide 162 has a second effective refractive index. In some embodiments, the second waveguide 162 comprises a second material. In some embodiments, the second material comprises a second dielectric material or a second semiconductor material. For example, the second material may be silicon. The second waveguide 162 has cross-sectional dimensions of less that about 1 micron; i.e., the height and width of the second waveguide 162 are less than about 1 micron. In some embodiments, the second waveguide 162 may be referred to as a nanowaveguide.

In some embodiments, the second waveguide 162 has the substantially the same cross-sectional dimensions as the first waveguide 111 and the third waveguide 113, and the first material is different than the second material. In some embodiments, the second waveguide 162 has different cross-sectional dimensions from the first waveguide 111 and the third waveguide 113, and the first material is the same as the second material.

The dimensions and positions of the first waveguide 111, the second waveguide 162, and the third waveguide 113 are specified such that when the second effective refractive index of the second waveguide 162 changes, a coupling between the first waveguide 111 and the third waveguide 113 changes. For example, in some embodiments, with the second effective refractive index at a first value, coupling between the first waveguide 111 and the third waveguide 113 may be eliminated or substantially eliminated. With the second effective refractive index at a second value, there may be coupling between the first waveguide 111 and the third waveguide 113. Alternatively, in some embodiments, with the second effective refractive index at a first value, there may be coupling between the first waveguide 111 and the third waveguide 113. With the second effective refractive index at a second value, coupling between the first waveguide 111 and the third waveguide 113 may be eliminated or substantially eliminated.

The second effective refractive index of the second waveguide 162 can be changed using different mechanisms. In some embodiments, the second effective refractive index can be changed by heating or cooling the second waveguide 162. In some embodiments, the second effective refractive index can be changed by applying an electric voltage to the second waveguide 162. In some embodiments, the second effective refractive index can be changed by passing electromagnetic radiation down the second waveguide 162. The second effective refractive index of the second waveguide 162 can be changed with other techniques.

Light may need to propagate a distance along the first waveguide 111 or the third waveguide 113 before coupling between the first waveguide 111 or the third waveguide 113 can be controlled. For example, the coupling length when the first waveguide 111 or the third waveguide 113 are to be coupled may be about 300 microns, about 100 microns to 300 microns, or about 150 microns to 450 microns. The second effective refractive index may need to be changed in the second waveguide 162 for a distance along the second waveguide 162 that is at least as long as the coupling length. In some embodiments, when light coupling between the first waveguide 111 and the third waveguide 113 is to be controlled, the specified distance over which the waveguides are parallel or substantially parallel is equal to or greater than the coupling length.

In some embodiments, such as the arrangement 150 shown in FIG. 1B, the first waveguide 111, the second waveguide 162, and the third waveguide 113 may be disposed on the substrate 105. In some embodiments, the second waveguide 162 may be recessed in the substrate 105, in between with the first waveguide 111 and the third waveguide 113 that are disposed on a surface of the substrate 105. Alternatively, in some embodiments, the first waveguide 111 and the third waveguide 113 may be recessed in the substrate 105, with the second waveguide 162 disposed on a surface of the substrate 105 and positioned in between the first waveguide 111 and the third waveguide 113. There are other arrangements of the three waveguides that are possible.

Figure 1C:
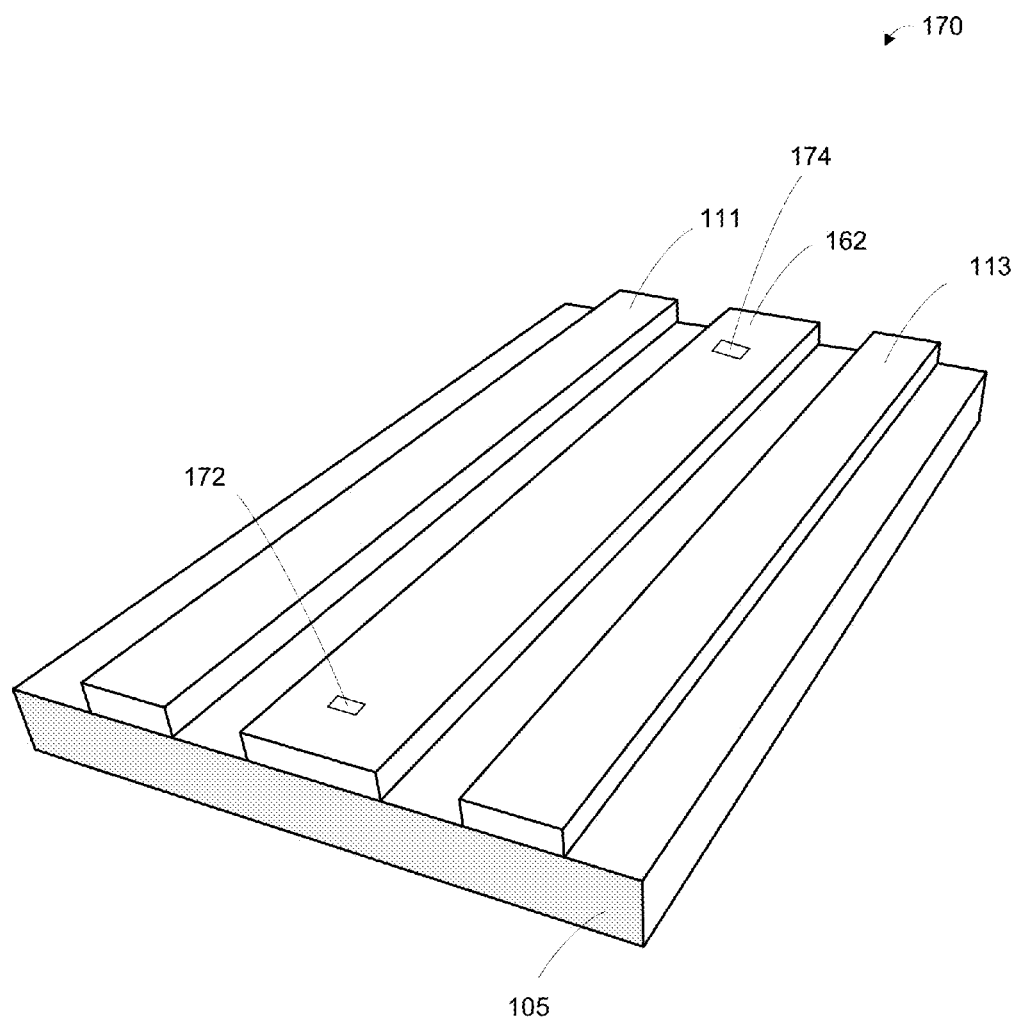
FIG. 1C shows an example of an isometric illustration of an arrangement of waveguides.

FIG. 1C shows an example of an isometric illustration of an arrangement of waveguides. In some embodiments, the arrangement 170 shown in FIG. 1C is similar to the arrangement 150 shown in FIG. 1B. The arrangement 170 shown in FIG. 1C includes a first electrode 172 and a second electrode 174 disposed on the second waveguide 162. In some embodiments, the first electrode 172 and the second electrode 174 are disposed on the same surface of the second waveguide 162. For example, when the second waveguide 162 has a square or rectangular cross section, the first electrode 172 and the second electrode 174 may be disposed on the same surface of the second waveguide 162.

In some embodiments, the first electrode 172 and the second electrode 174 are spaced about 300 microns apart, about 100 microns to 300 microns apart, or about 150 microns to 450 microns apart on the second waveguide 162. In some embodiments, the first electrode 172 and the second electrode 174 are spaced apart from one another on the second waveguide 162 in the direction that light would propagate in the second waveguide 162.

In some embodiments, the first electrode 172 and the second electrode 174 comprise a metal. For example, the metal may comprise a metal selected from a group consisting of gold, platinum, and titanium.

These electrodes can be used to change the second effective refractive index of the second waveguide 162. For example, a voltage may be applied between the first electrode 172 and the second electrode 174. The voltage may change the carrier density (e.g., electron density) in the second waveguide 162 (e.g., by injecting electrons into the second waveguide 162) and control the coupling between the first waveguide 111 and the third waveguide 113. For example, output from third waveguide 113 may be turned "on" and "off." In some embodiments, the carrier density is changed to be about $0.6 \times 10^{18}$ cm$^{-3}$ to $1.8 \times 10^{18}$ cm$^{-3}$, or about $1.2 \times 10^{18}$ cm$^{-3}$. In some embodiments, there is coupling between the first waveguide 111 and the third waveguide 113 when the carrier density in the second waveguide 162 is changed by applying a voltage between the first electrode 172 and the second electrode 174. In some embodiments, there is no coupling or substantially no coupling between the first waveguide 111 and the third waveguide 113 when the carrier density in the second waveguide 162 is changed by applying a voltage between the first electrode 172 and the second electrode 174.

The embodiments described herein may be implemented in a silicon photonics platform in which the waveguides are non-lossy. This platform may be manufactured with current fabrication facilities based on silicon. Also, compatibility with the electronic properties of silicon makes a silicon photonics platform useful for demonstration of the ultrafast interconnection properties.

The embodiments described herein also may be implemented using a hybrid waveguide configuration, where a plasmonic waveguide is disposed between two non-lossy dielectric waveguides (e.g., dielectric-metal-dielectric (DMD) configuration). Such a configuration may support a long propagation length despite a lossy central waveguide, and also have high modulation capabilities in a small footprint.

EXAMPLES

The following examples are intended to be examples of the embodiments disclosed herein, and are not intended to be limiting.

Adiabatic Elimination in a Three-Waveguide System.

The evolution of the electrical fields in three coupled mode systems can be described by the general equations [31,32]: $\partial_z A_i = i(\Delta\beta_{ij}A_i + \Sigma_{j \neq i}V_{ij}A_j)$, i,j=1, 2, 3, where $A_i$ is the electromagnetic field of the different modes, $V_{ij}$ is the coupling strength between waveguides i and j, $\Delta\beta_{ij}$ is the mode propagation constant difference, $$\Delta\beta_{ij} = \beta_i - \beta_j = \frac{\omega}{c}(n_i^{eff} - n_j^{eff}),$$

$\omega$ is the frequency of the light, c is the speed of light, and $n_i^{eff}$ is the effective mode index of waveguide i. The adiabatic elimination (AE) procedure in waveguides, in analogy to atomic physics, relies on a strong coupling between nearby waveguides that exhibit a very large mode index mismatch between them ($|\Delta\beta_{12}|, |\Delta\beta_{23}| \gg V_{12}, V_{23}$). Since each of the two consecutive coupling processes is greatly mismatched, the amplitude of the middle waveguide $A_2$ will oscillate very rapidly in comparison to the slow varying amplitudes $A_1$ and $A_3$. As a result, the amplitude of the intermediate waveguide cannot build up significantly and thus remains as in its initial value (i.e. $|A_2(z)| \approx |A_2(z=0)|$). FIGS. 2A-2F show a schematic comparison between the evolution of identical three-mode system and the AE evolution both in the atomic physics realization and in directional waveguides.

A general three-coupled mode system can be realized in atomic systems (FIG. 2A) and in a three waveguide coupler (FIG. 2B). These systems share equivalent dynamics where the time evolution of the population of electrons in each level is analogous to the electric field propagation in each waveguide. In both cases the evolution is dictated by the couplings between the modes $V_{ij}$ and by the detunings $\Delta_{ij}$ or the difference between propagation constants $\Delta\beta_{ij}$.

Shown in FIG. 2C is the intensity evolution in three identical waveguides, where $V_{12}=V_{23}$ and the light is injected in waveguide 1. This evolution is equivalent to on-resonant three level atomic interactions, where all the electrons are initially in the ground state. As seen, all the waveguides have a significant light intensity throughout the propagation as a result of the couplings.

As shown in FIG. 2D, the AE process in the atomic system relies on a strong coupling between nearby levels that exhibit a very large detuning between them ($\Delta_{12}$, $\Delta_{23} \gg V_{12}, V_{23}$). Since each of the two coupling processes is greatly detuned, the amplitude of the intermediate level oscillates very rapidly in comparison to the slow varying population in the other levels resulting in no significant build up and remaining at its initial value. The three-level system is thus reduced to an effective 2-level system with an effective coupling $$V_{\it{eff}} = \left| \frac{V_{12} V_{23}}{\Delta \beta_{12}} \right|$$

between the ground and the excited states, and with the intermediate level being a 'dark' state.

FIG. 2E shows the AE analogue in optical waveguides. The outer waveguides become an effective 2-mode coupler with $$V_{\it{eff}} = V_{13} - \frac{V_{12} V_{23}}{\Delta \beta_{12}} \ldots$$

and the middle waveguide is a 'dark mode'. Importantly, the coupling between the two outer waveguides is now controllable through $\Delta \beta_{12}$.

FIG. 2F shows that when AE conditions are met, the light injected in waveguide 1 propagates only in the outer waveguides 1 and 3. The middle waveguide is effectively eliminated, as its energy buildup remains very low during the entire propagation.

Once AE conditions have been imposed, the effective coupling coefficient in this reduced two level dynamics between the two outer waveguides becomes $$V_{\it{eff}} = \sqrt{\left( V_{13}^* + \frac{V_{23}^* V_{12}^*}{\Delta \beta_{12}} \right) \left( V_{13} - \frac{V_{12} V_{23}}{\Delta \beta_{23}} \right)},$$

and energy can be efficiently transferred between the outer waveguides via the middle one when the outer waveguides have the same mode index ($|\Delta \beta_{12} + \Delta \beta_{23}| z \ll 1$). This expression reveals that the coupling between the outer waveguides depends not only on the couplings in the original three-waveguide system, but also on the difference in the mode propagation constants between the outer waveguides and the middle waveguide even though the latter is 'eliminated'. In other words, one can control the coupling between the outer waveguides if the AE conditions can be met, for example, by changing the effective refractive index of the middle waveguide. Moreover, the efficiency of conversion from $A_1$ and $A_3$ does not change even when the middle waveguide is extremely lossy. An important parameter that characterizes the degree of elimination in such an adiabatic process is $$\frac{V_{12}}{\Delta \beta_{12}},$$

which should be much lower than unity in order to ensure AE evolution.

Also, it is worth noting that the propagation constant mismatch of the effective two-mode system is modified as well:

$$\Delta \beta_{\it{eff}} = \Delta \beta_{12} + \Delta \beta_{23} + \frac{|V_{12}|^2}{2 \Delta \beta_{12}} + \frac{|V_{23}|^2}{2 \Delta \beta_{23}} = \Delta \beta_{TP} + \Delta \beta_s,$$

where in addition to the conventional phase-mismatch terms, two more terms, equivalent to the Stark-shift terms in atomic physics, influence the evolution. This atomic physics analogue for active control with a nanoscale footprint expands earlier theoretical analyses of three waveguide couplers [33-35], and brings new insight for sub-wavelength silicon devices. It should also be noted that in contrast to the waveguide analogue to stimulated rapid adiabatic passage (STIRAP), where the couplings between the waveguides vary adiabatically along the propagation, in the AE scheme the couplings between the waveguides remain fixed, and the adiabaticity resides in the slow oscillating energy transfer between waveguide 1 and 3 as compared with the very fast oscillations between 1 and 2, and 2 and 3.

Observation of the AE 2+1 Decomposition in Waveguides.

The unique AE was experimentally demonstrated in directional waveguides using a silicon on insulator (SOI) platform. The sample consists of three waveguides, where two identical outer waveguides have the same width, thus the same effective refractive index and a varying middle waveguide width. The middle waveguide was designed wider than the outer waveguides in order to meet the AE conditions, while using same width for the control sample. In all the configurations the gap between the outer waveguides was kept constant.

The silicon waveguides were fabricated in a silicon-on-insulator (SOI) substrate. The thickness of silicon and buried oxide were 340 nanometers (nm) and 1 micron, respectively. A 160-nm-thick hydrogen silsesquioxane (HSQ) resist was spun on the SOI substrate. The HSQ layer was patterned by electron-beam lithography for the etching mask. The silicon waveguides were formed by reactive ion etching (RIE) in $Cl_2/HBr/O_2$. 10:1 buffered HF was used to remove the HSQ mask.

Figures 3A, 3B:
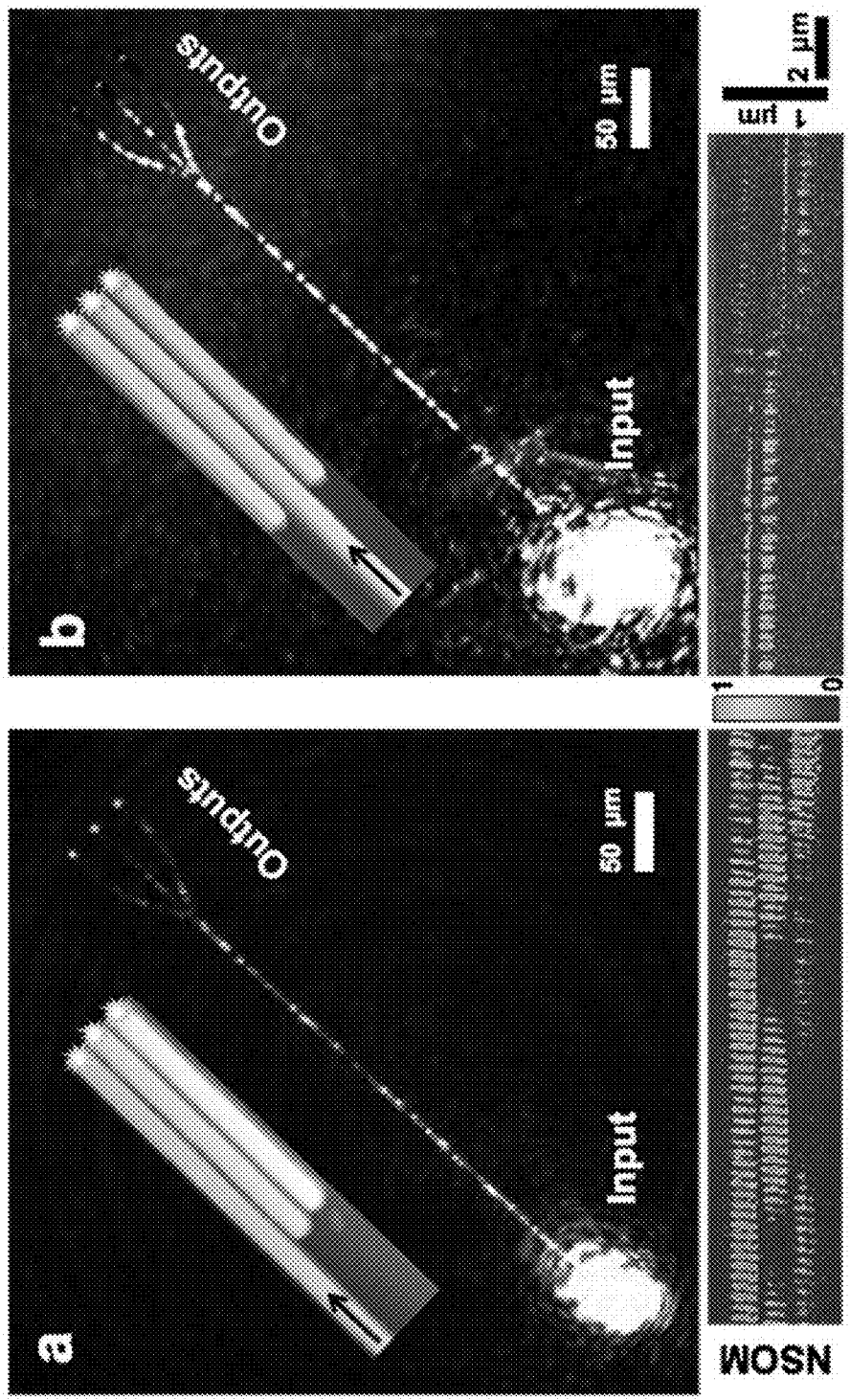
FIGS. 3A-3F show experimental observations of adiabatic elimination compared to ordinary three identical waveguides.

FIGS. 3A-3F show experimental observation of adiabatic elimination compared to ordinary three identical waveguides. FIGS. 3A and 3B show far-field and NSOM measurements in a three identical waveguides configuration. Due to the coupling between the waveguides, light appears in all waveguides along the propagation, regardless if the input of the light is injected to the outer (FIG. 3A) or the middle waveguide (FIG. 3B).

Figures 3C, 3D:
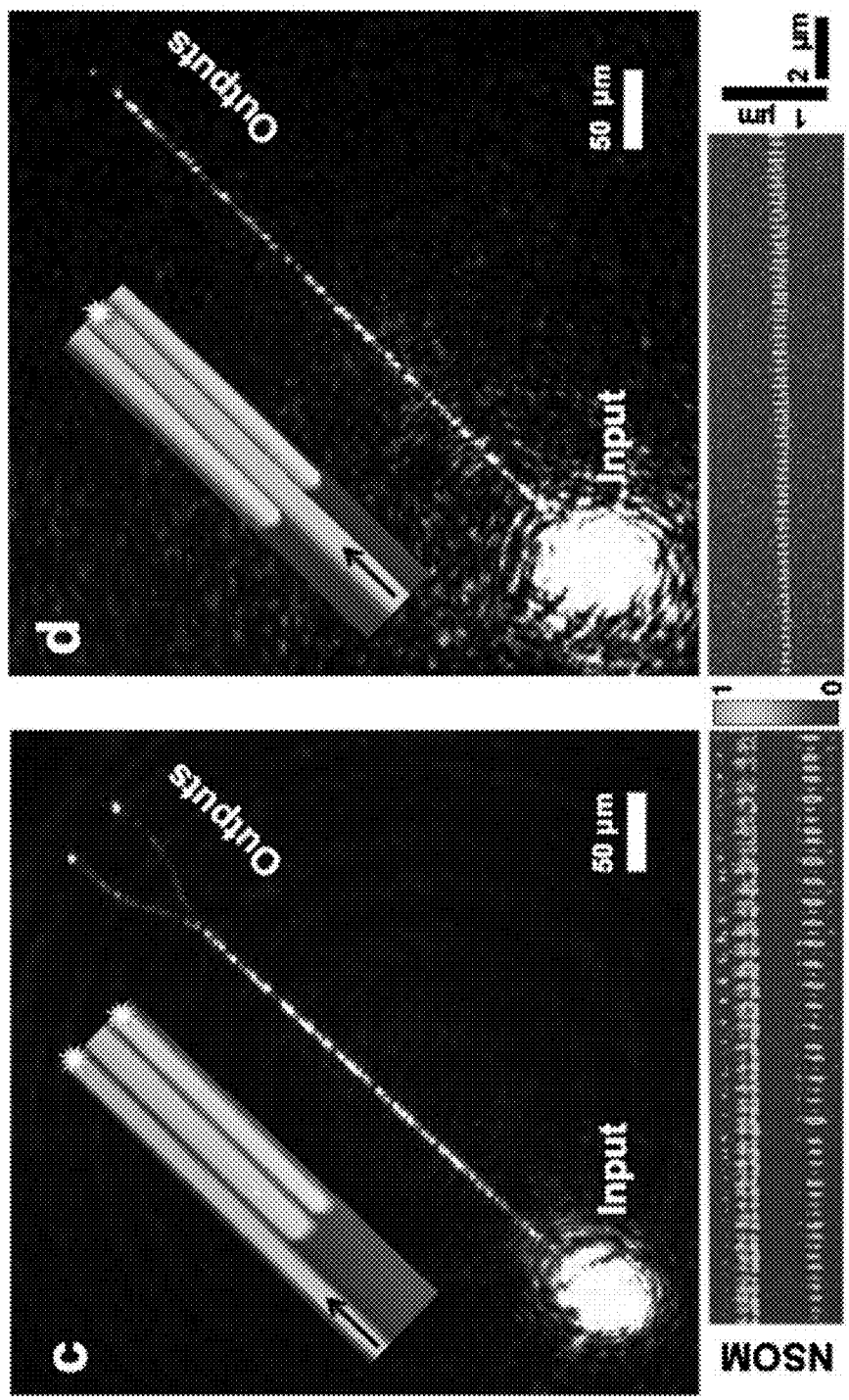
Figure 3E:
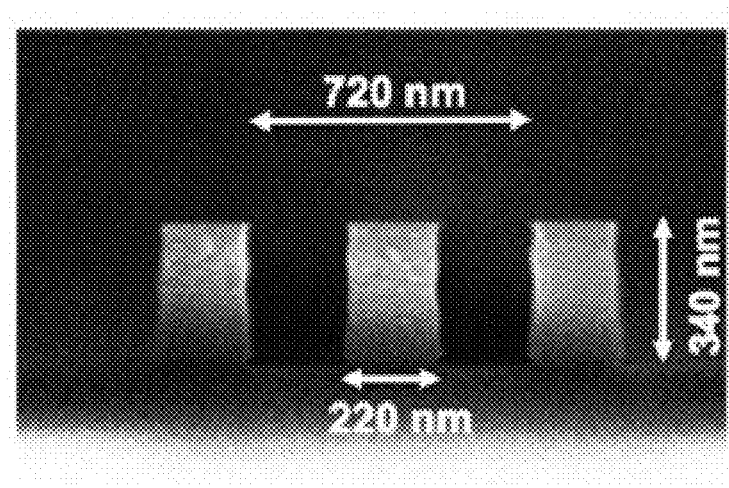
Figure 3F:
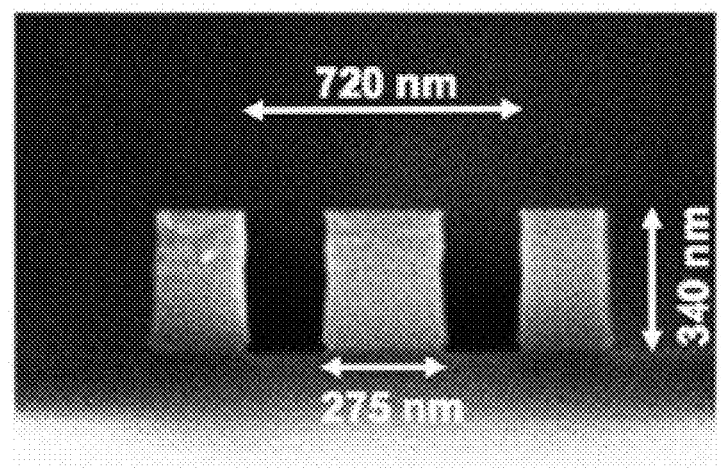

FIGS. 3C and 3D show experimental observations of adiabatic elimination (AE) in an AE configuration with a wider middle waveguide. The '2+1' decomposition of three coupled modes into an effective two coupled mode system of the outer waveguides (FIG. 3C), and a dark middle waveguide was observed (FIG. 3D). Light is coupled to an outer waveguide in an AE configuration (FIG. 3C). The far field image shows that only the outer waveguides emit light at the output. The near-field image confirms absence of light in the middle waveguide along the entire propagation. Light is coupled to the middle waveguide in an AE configuration (FIG. 3D). Only the middle waveguide emits light at the output without coupling into nearby outer waveguides. The near-field image shows that no light leaks out from the middle waveguide. Inset AFM images shows each of the three waveguides with the inputs and the outputs. The SEM images (FIGS. 3E and 3F) show the cross section of the fabricated waveguides for the AE configuration and for the identical waveguides configuration. A CW laser with $\lambda$=1310 nm, the width of the outer waveguides was fixed to $W_1$=$W_3$=220 nm, where for the AE configuration $W_2$=275 nm, and for the control waveguide configuration $W_2$=220 nm, was used. The height of the waveguides was 340 nm and the gap between the outer waveguides was kept at 720 nm for both cases. The propagation length was 300 µm for all configurations.

In the AE configuration, the dynamics are decomposed into an effective two-mode system and a dark mode. When light was coupled to an outer waveguide (#1), it remains only in the two outer waveguides along the entire propagation (FIG. 3C). On the other hand, when light is injected to the middle waveguide, it remains trapped along the propagation, without coupling to the outer waveguides (FIG. 3D). In all cases, properly designed grating couplers and spot size converters have been employed. This is in clear contrast to the controls where all the waveguides participate in the evolution for both injections (FIGS. 3A and 3B). Also, these dynamics were confirmed with both far-field and near field measurements. These measurements are in a good agreement with numerical simulations.

Band-Diagram Picture of the AE in Waveguides.

The AE process in three coupled waveguides system can be understood using a band diagram of the system's eigenmodes as a function of the middle waveguide width $W_2$ (FIGS. 4A-4C). It was observed that in the control configuration the eigenmodes of the coupled system involve necessarily all of the waveguides. However, the AE regime, which occurs when the mode index of the middle waveguide differs significantly from the mode index of the outer waveguides, gives rise to an increasingly decoupled eigenmode involving the middle waveguide only. The two other eigenmodes involve only the outer waveguides in a symmetric and anti-symmetric fashion, similar to the conventional two-mode coherent coupler. Hence, in the AE regime, the dynamics can be split into 2+1 (effective two-level and a 'dark state', respectively) dynamical spaces. This decomposition occurs for both transverse-magnetic (TM) (FIGS. 4A-4C) and transverse-electric (TE) polarizations. Moreover, the AE regime is very robust and broadband. Also, it should be noted that in the case where the middle waveguide is narrower than the outer waveguide, i.e., its mode index is smaller than the outer modes indices, another regime of AE dynamics exists with possible higher effective couplings (as the two contributions in the effective coupling expression will add up constructively). This comes, however, with a risk of wavelength cut-off.

FIGS. 4A-4C show a band diagram of a three-mode coupler with varying middle waveguide width $W_2$. The band diagram shows the electric field eigenvalues and eigenmodes of the system for TM polarization. In FIG. 4B, all the three waveguides are identical, $W_1$=$W_2$=$W_3$=220 nm and are mixed in the eigenmodes of the system. In this configuration, an input in one of the waveguides is projected necessarily on all the waveguides. In FIG. 4C, the AE regime is shown. The AE regime is reached when $W_2$ is larger and the sample ($W_2$–275 nm) is in this regime. Here, an eigenmode involving only the middle waveguide emerges and becomes less coupled, since the coupling is proportional to $1/\Delta n$ where $\Delta n = n_1^{\it eff} - n_2^{\it eff}$, leading to the elimination of the middle waveguide. The two remaining eigenmodes are symmetric and anti-symmetric superpositions of the outer waveguides as in a conventional two-mode coherent coupler. An input in either of the outer waveguides will be projected only onto those two eigenmodes, resulting in an effective two-waveguide system evolution, while the middle waveguide remains 'dark' along the propagation. On the other hand, an input injected in the middle waveguide is projected only onto the dark mode of the system and will stay 'trapped' in the middle waveguide without transferring energy to the adjacent ones.

Active Coupling Control Based on AE.

The AE scheme was applied to dynamically control the effective coupling between the outer waveguides by changing the mode index of the decoupled middle waveguide. Taking advantage of the large nonlinear Kerr coefficient of silicon [36] combined with the high light confinement enabled by the sub-wavelength cross section of silicon photonic waveguides [37-38], a localized index change in the middle waveguide was obtained.

Figure 5A:
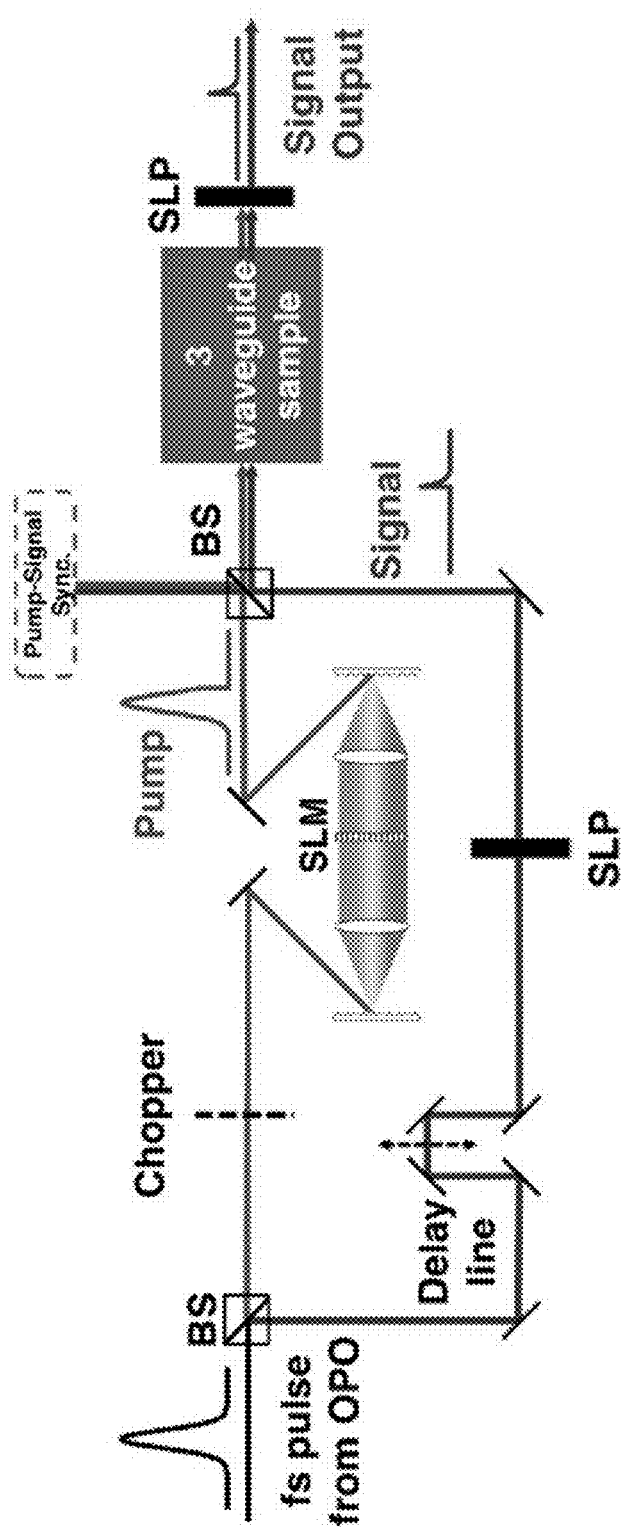
FIGS. 5A-5C show active coupling control between outer waveguides in the AE configuration.
Figure 5B:
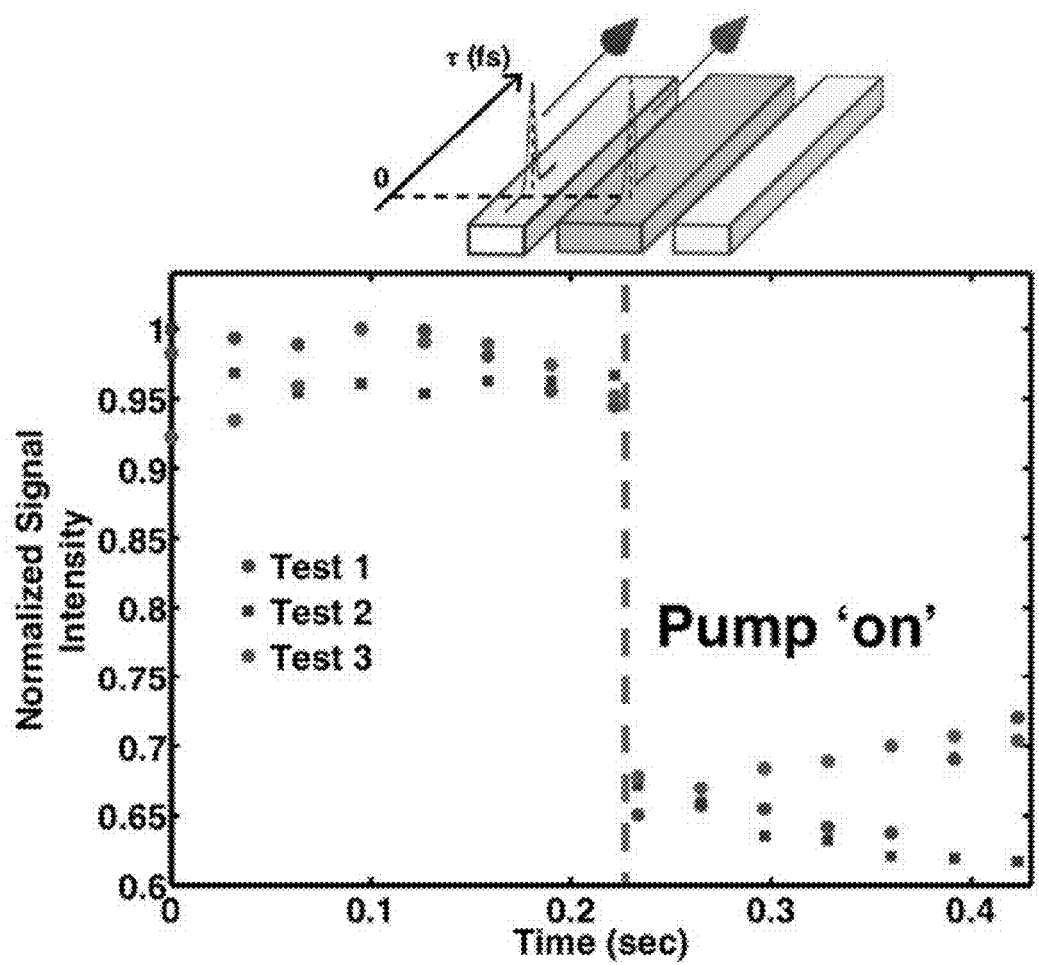

Using a single-shot nonlinear technique [39], the signal was coupled to one of the outer waveguides while the pump beam is coupled to the middle waveguide (FIG. 5A). The AE evolution confines the pump beam to the middle waveguide along the propagation thus ensuring no leakage to the outer waveguides. Proper synchronization between the signal and the pump was insured. That the signal collected was modulated in the presence of the pump was clearly observed (FIG. 5B). The modulation originates from the nonlinear change of refractive index in the middle waveguide as the pump beam propagates. This change, which increases the phase-mismatch between the middle and the outer waveguides ($n_{middle} = n_{middle}^0 + n_2 I_{pump} \rightarrow \Delta\beta_{12} = \Delta\beta_{12}^0 + 2\pi n_2 I_{pump}/\lambda$), in turn affects the effective coupling between waveguides #1 and #3. This leads to a change in the inversion length ($L_{inv}$), manifested as a change of output intensity in a waveguide of a given length ($\Delta\beta_{12}$ increases→$\Delta V_{\it eff}$ decreases→$L_{inv}$ increases).

Numerical simulations of the coupled nonlinear Schrodinger equations showed that the result discussed above was consistent with a change of index of $\Delta n = (7.15 \pm 0.25) \times 10^{-3}$ in the middle waveguide with a pulse energy of 66±6 pJ. It was also confirmed that in the presence of the pump in the middle waveguide the inversion length in the outer waveguides increases. The effect as a function of pump-signal delay was checked and it was confirmed that (1) the effect observed in the synchronized measurements stems from an ultrafast change of index in the middle waveguide and that (2) two photon absorption (TPA) generated free carriers do no play a significant role in the process (FIG. 5C) [17-18].

Figure 5C:
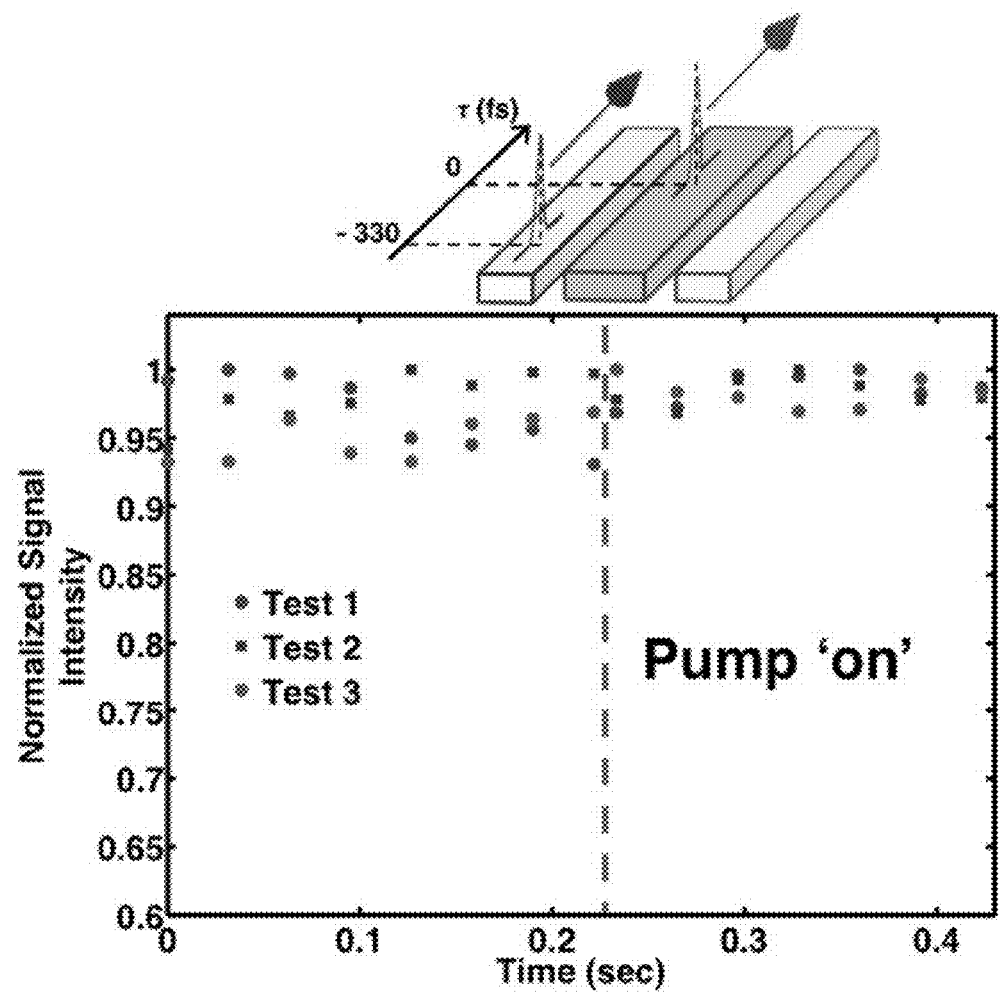

FIGS. 5A-5C show active coupling control between outer waveguides in the AE configuration. FIG. 5A shows a schematic diagram of the experimental apparatus. The ultrashort pulse (~140 fs with central wavelength at 1310 nm) is split into a strong truncated pump beam that is coupled to the middle waveguide and the weak signal beam that is coupled to one of the outer waveguide. On the pump path, a mechanical chopper is used to turn off and on the injection of the pump pulse to the middle waveguide. On the signal path, a delay line is used to synchronize the entrance of the pump and signal. FIG. 5B shows the observed modulation as a result of varied coupling in the presence of a synchronized pump beam, showing a significant reduction of the signal intensity when the pump is present. FIG. 5C shows that in the presence of a delayed pump beam (330 fs delay between pump and signal), no change in the signal output is observed. This indicates that the modulation of index originates from the fast Kerr nonlinearity rather than long-lived Free Carriers (FC) effect. Several tests were performed to show repeatability of the process and exclude laser fluctuations.

As has been shown, this unique AE scheme separates spatially the control in the middle waveguide from the signal in the outer waveguides. Therefore, other physical effects can be employed to change the mode index of the middle waveguide such as thermal, mechanical, or electronic processes. More importantly, the AE scheme holds also when the middle waveguide is lossy. The loss originates from the imaginary part of the refractive index which can be either due to a linear effect, as in plasmonic and near resonant interactions, or a nonlinear effect, where the imaginary part of a third order susceptibility is intensity dependent and alters the index of refraction, as in TPA and free-carrier absorption (FCA)-induced losses in silicon. In such cases, the effective mode index of the middle waveguide as well as the coupling coefficients will become complex valued. Nonetheless, when employing the adiabatic elimination procedure, which equalizes the rate of light transfer to and from the middle waveguide, the effective propagation length of the signal in a lossy middle waveguide is minimized, thus the effective loss in the effective two-waveguides evolution will be significantly reduced as compared to the equivalent 2-waveguide system. The reduced effective loss in the AE configuration holds the potential to further reduce the footprint with plasmonic waveguides without facing the losses typically associated.

Inspired by the atomic AE, the AE scheme described herein of active control for nanoscale waveguiding brings new insight for subwavelength silicon photonics. Since AE enables unprecedented tunable coupling, it further allows a zero effective coupling between the outer waveguides that cancels light transfer and eliminates the cross talks between waveguides, which is needed for ultra-dense nano-photonics interconnects. This is due to a degeneracy in the coupled system, where the sequential coupling strength ($V_{12} V_{23}/\Delta\beta$) is equal to the direct coupling ($V_{13}$), leading to a full destructive interference along the entire propagation. This degeneracy happens when the middle waveguide's effective index is higher than the outer waveguides, i.e., when $\Delta\beta=\Delta\beta_{23}=-\Delta\beta_{12}>0$. It was found that this constraint can be satisfied for TE mode where the sizes of the waveguides are of the same order as the gap between the waveguides, thus allowing significant coupling between the outer waveguides. Hence, at this singular point, all three waveguides are decoupled from each other despite the fact they are densely packed with a sub-wavelength gap, thus yielding the capability to shield information from the surrounding within the evanescent range.

As described, the AE scheme provides a new way in achieving dense optical waveguiding with negligible crosstalk. For example, for a given gap between two waveguides of 800 nm, coupling length under AE conditions can be as long as 1.3 mm, in sharp contrast with 105 µm in a conventional directional coupler with the same gap. However, according to simulations, dimensional accuracy required for the realization of such excellent shielding is on the order of a few nanometers, a challenging fabrication task at present. It is nonetheless possible as the nanofabrication further improves.

CONCLUSION

In conclusion, the AE decomposition scheme in nano-waveguides has been demonstrated. Is was shown this approach enables on demand dynamical control of the coupling between two closely packed waveguides by modulating the mode index of an in-between decoupled waveguide. This is in contrast to the conventional directional couplers where the constant coupling coefficient is pre-determined by the gap or spacing in between the waveguides. AE offers an attractive alternative route for the control of optical information in integrated nanophotonics. The AE approach provides a new flexible toolbox to design densely packed power-efficient nano-scale photonic components, such as compact modulators, ultrafast optical signal routers, and interconnects.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

REFERENCES (1) Vlasov, Y. A. Silicon integrated nanophotonics: road from scientific explorations to practical applications. Plenary talk, CLEO (2012).
(2) Soldano, L. B. & Pennings, E. C. M. Optical Multi-Mode interference Devices Based on Self-Imaging: Principles and Applications, Journal of Lightwave Technology, 13, 615-627, (1995).
(3) Kawaguchi, Y. & Tsutsumi, K. Mode multiplexing and demultiplexing devices using multimode couplers, Electronics Letters, 38, 1701-1702, (2002).
(4) Huang, Y., Xu G. & Ho, S.-T, Ultracompact Optical Mode Order Converter, Photonic Technology Letters, 18, 2281-2283, (2006).
(5) Luo, L.-W. et al. WDM-compatible mode-division multiplexing on a silicon chip, Nat. Communications, 5, 3069, (2014).
(6) Yariv, A. Coupled-mode theory for guided-wave optics. *IEEE Journal of Quantum Electronics*, 9(9), 919-933 (1973).
(7) Green, W. M., Rooks, M. J., Sekaric & L., Vlasov, Y. A. Ultra-compact, low RF power, 10 Gb/s silicon Mach-Zehnder modulator. *Opt. Express* 15, 17106-17113 (2007).
(8) Xu, Q., Schmidt, B., Pradhan, S., Lipson, M. Micrometre-scale silicon electro-optic modulator. *Nature*, 435, 325-327 (2005).
(9) Reed, G. T., Mashanovich, G., Gardes, F. Y., & Thomson, D. J. Silicon optical modulators. *Nat. Photonics*, 4, 518-526 (2010).
(10) Peruzzo, A. et al., Quantum walks of correlated photons, *Science*, 329, 1500-1503, (2010).
(11) Peruzzo, A. et al. Quantum Delayed-Choice Experiment. *Science*, 338, 634-637 (2012).
(12) Almeida, V. R., Barrios, C. A., Panepucci, R. R., & Lipson, M. All-optical control of light on a silicon chip. *Nature*, 431, 1081-1084 (2004).
(13) Jensen, S. M. The nonlinear coherent coupler. *IEEE Journal of Quantum Electronics*, 18, 1580-1583 (1982).
(14) Friberg, S. R., Weiner, A. M., Silberberg, Y., Sfez, B. G., & Smith, P. S. Femtosecond switching in a dual-core-fiber nonlinear coupler. *Optics Letters*, 13, 904-906 (1988).
(15) Stegeman, G. I., Seaton, C. Nonlinear integrated optics. *Journal of Applied Physics*, 58, R57 (1985).
(16) Lederer, F. et al. Discrete solitons in optics. *Physics Reports*, 463, 1-126 (2008).
(17) Boyraz, Ö., Koonath, P., Raghunathan, V., Jalali, B. All optical switching and continuum generation in silicon waveguides. *Opt. Express* 12, 4094-4102 (2004).
(18) Villeneuve, A. et al., Nonlinear Absorption in a GaAs Waveguide Just Above Half the Band Gap. *IEEE J. Quant. Electron.* 30, 1172-1175 (1994).

(19) Simon, R. U. A. Polarization optics of twisted single-mode fibers. *Applied Optics,* 18, 2241-2251 (1979)
(20) Allen, L., Eberly J. H. Optical resonance and two-level atoms. Courier Dover Publications (1975).
(21) D'Alessandro, D. *Introduction to Quantum Control and Dynamics* (CRC, Cleveland, 2007);
(22) Polack, T., Suchowski, H., Tannor, D. J. Uncontrollable quantum systems: A classification scheme based on Lie subalgebras. *Phys. Rev. A,* 79, 053403 (2009).
(23) Shore, B. W., Cook R. J. Coherent dynamics of N-level atoms and molecules. IV. Two- and three-level behavior. *Phys. Rev. A,* 20, 1958-1964 (1979).
(24) Vitanov, N. V., Halfmann, T., Shore, B. W., Bergmann, K., Laser-induced population transfer by adiabatic passage techniques. *Annu. Rev. Phys. Chem.,* 52, 763-809, (2001).
(25) Lahini, Y., Pozzi, F., Sorel, M., Morandotti, R., Silberberg, Y., EIT and STIRAP in Waveguides: Linear and Nonlinear Effects in a Three-Core Coupled System. Nonlinear Photonics, BGPP.2007.JWBPDP1, Quebec City, Canada (2007).
(26) Lahini, Y. et al., Effect of Nonlinearity on Adiabatic Evolution of Light. *Phys. Rev. Lett.,* 101, 193901 (2008).
(27) Longhi, S., Adiabatic passage of light in coupled optical waveguides, *Phys. Rev. E,* 73, 026607 (2006)
(28) Ciret, C., Coda, V., Rangelov, A. A., Neshev, D. N., Montemezzani, G. Broadband adiabatic light transfer in optically induced waveguide arrays. *Phys. Rev. A,* 87, 013806 (2013).
(29) Tannor, D., *Introduction to Quantum Mechanics: A Time-Dependent Perspective.* University Science Book (2006).
(30) Brion, E., Pedersen, L. H. & Mølmer, K. Adiabatic elimination in a lambda system. *J. Phys. A: Math. Theor.,* 40, 1033-1043 (2007).
(31) Shuang, S. L., *Physics of Photonics Devices,* $2^{nd}$ ed. 300-307, Wiley (2009).
(32) Yariv, A., *Optical Electronics,* $4^{th}$ ed., 519-520, Saunders College Publishing (1991)
(33) Hardy, A., Streifer, W. Coupled mode solutions of multiwaveguide systems. *IEEE J. Quantum Electron.,* 22, 528-534 (1986).
(34) Ruschin, S., Marom E., Coupling effects in symmetrical three-guide structures, *JOSA A,* 1, 1120-1128 (1984).
(35) Kalonakis, K., Paspalakis, E. Optical switching in a symmetric three-waveguide nonlinear directional coupler. *Journal of Modern Optics* 52, 1885-1892 (2005).
(36) Lin, Q. et al. Dispersion of silicon nonlinearities in the near infrared region. *Applied Physics Letters,* 91, 021111 (2007).
(37) Foster, M. A., Turner, A. C., Lipson, M., Gaeta, A. L. Nonlinear optics in photonic nanowires. *Optics Express,* 16(2), 1300-1320 (2008).
(38) Leuthold, J., Koos, C., Freude, W. Nonlinear silicon photonics. *Nat. Photonics,* 4, 535-544 (2010).
(39) Dudovich, N., Oron, D., Silberberg, Y. Single-pulse coherently controlled nonlinear Raman spectroscopy and microscopy. *Nature,* 418, 512-514 (2002).
(40) Cooper, M. L. et al., Quantitative infrared imaging of silicon-on-insulator microring resonators. *Opt. Lett.* 35, 784-786 (2010)
(41) Hillenbrand, R. Keilmann, F., Complex Optical Constants on a Subwavelength Scale, *Physical Review Letters* 85, 3029-3032 (2000).

What is claimed is:

1. An arrangement of waveguides comprising:
a substrate;
a first waveguide having a first effective refractive index and being a linear waveguide having cross-sectional dimensions of less than about 1 micron;
a second waveguide being a linear waveguide having cross-sectional dimensions of less than about 1 micron; and
a third waveguide having the first effective refractive index and being a linear waveguide having cross-sectional dimensions of less than about 1 micron, the first, the second, and the third waveguides arranged on the substrate, the first, the second, and the third waveguides being substantially parallel over a specified distance, the second waveguide being positioned between the first waveguide and the third waveguide, the first waveguide being positioned less than about 1 micron from the second waveguide, the third waveguide being positioned less than about 1 micron from the second waveguide, the first waveguide and the third waveguide having substantially the same cross-sectional dimensions, dimensions and positions of the first, the second, and the third waveguides being specified to substantially eliminate coupling between the first waveguide and the third waveguide over a distance of about 1 millimeter to 2 millimeters along lengths of the first waveguide, the second waveguide, and the third waveguide.

2. The arrangement of claim 1, wherein the first waveguide is positioned less than about 2 microns from the third waveguide.

3. The arrangement of claim 1, wherein the first waveguide, the second waveguide, and the third waveguide are disposed on the substrate.

4. The arrangement of claim 1, wherein the first waveguide and the third waveguide comprise a first material, and wherein the first material comprises a first dielectric material or a first semiconductor material.

5. The arrangement of claim 4, wherein the second waveguide comprises the first material.

6. The arrangement of claim 4, wherein the cross-sectional dimensions of the first waveguide and the third waveguide are different than the cross-sectional dimensions of the second waveguide.

7. The arrangement of claim 4, wherein the second waveguide comprises a second material, and wherein the second material is selected from a group consisting of a second dielectric material, a second semiconductor material, and a metal.

8. The arrangement of claim 1, wherein the second waveguide has a second effective refractive index, and wherein the second effective refractive index is different than the first effective refractive index.

9. The arrangement of claim 1, wherein the first, second, and third waveguides have a height of about 200 nanometers to 500 nanometers, wherein the first and the third waveguides have a width of about 200 nanometers to 300 nanometers, wherein the second waveguide has a width of about 250 nanometers to 330 nanometers, wherein the first waveguide is positioned about 150 nanometers to 350 nanometers from the second waveguide, and wherein the third waveguide is positioned about 150 nanometers to 350 nanometers from the second waveguide.

10. An arrangement of waveguides comprising:
a substrate;
a first waveguide having a first effective refractive index and being a linear waveguide having cross-sectional dimensions of less than about 1 micron;
a second waveguide having a second effective refractive index and being a linear waveguide having cross-sectional dimensions of less than about 1 micron; and
a third waveguide having the first effective refractive index and being a linear waveguide having cross-sectional dimensions of less than about 1 micron, the first, the second, and the third waveguides arranged on the substrate, the first, the second, and the third waveguides being substantially parallel over a specified distance, the second waveguide being be positioned between the first waveguide and the third waveguide, the first waveguide being positioned less than about 1 micron from the second waveguide, the third waveguide being positioned less than about 1 micron from the second waveguide, the first waveguide and the third waveguide having substantially the same cross-sectional dimensions, dimensions and positions of the first, the second, and the third waveguides being specified such that when the second effective refractive index changes, a coupling between the first and the third waveguides changes.

11. The arrangement of claim 10, wherein the first waveguide is positioned less than about 2 microns from the third waveguide.

12. The arrangement of claim 10, wherein the first waveguide, the second waveguide, and the third waveguide are disposed on the substrate.

13. The arrangement of claim 10, wherein the first waveguide and the third waveguide comprise a first material, wherein the first material comprises a first dielectric material or a first semiconductor material, wherein the second waveguide comprises a second material, and wherein the second material comprises a second dielectric material or a second semiconductor material.

14. The arrangement of claim 13, wherein the first material is the same as the second material.

15. The arrangement of claim 13, wherein the cross-sectional dimensions of the first waveguide and the third waveguide are different than cross-sectional dimensions of the second waveguide.

16. The arrangement of claim 13, wherein the first material and the second material are different materials.

17. The arrangement of claim 10, wherein the first, second, and third waveguides have a height of about 200 nanometers to 500 nanometers, wherein the first and the third waveguides have a width of about 200 nanometers to 300 nanometers, wherein the second waveguide has a width of about 250 nanometers to 330 nanometers, wherein the first waveguide is positioned about 150 nanometers to 350 nanometers from the second waveguide, and wherein the third waveguide is positioned about 150 nanometers to 350 nanometers from the second waveguide.

18. The arrangement of claim 10, further comprising:
a first electrode and a second electrode disposed on the second waveguide.

19. The arrangement of claim 18, wherein the first electrode and the second electrode are spaced about 150 microns to 450 microns from one another on the second waveguide in a direction of light propagation in the second waveguide.

20. The arrangement of claim 18, wherein the first electrode and the second electrode comprise a metal selected from a group consisting of gold, platinum, and titanium.

* * * * *